G. HAUCK.
Horse Hay-Rake.
No. 107,256. Patented Sept. 13, 1870.
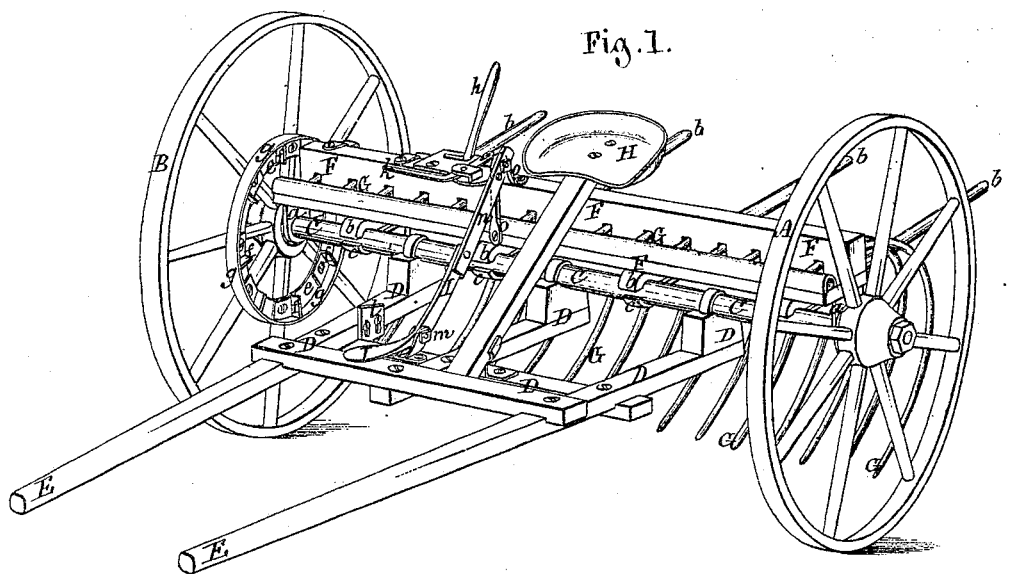
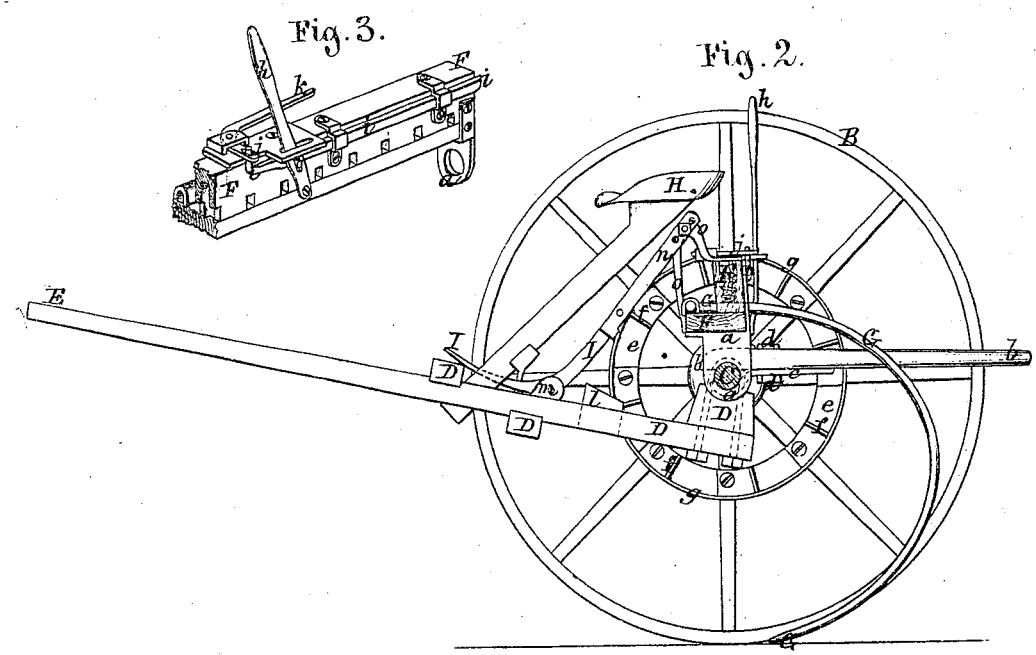

UNITED STATES PATENT OFFICE.

GEORGE HAUCK, OF MECHANICSBURG, PENNSYLVANIA.

IMPROVEMENT IN HORSE HAY-RAKES.

Specification forming part of Letters Patent No. 107,256, dated September 13, 1870.

*To all whom it may concern:*

Be it known that I, GEORGE HAUCK, of Mechanicsburg, in the county of Cumberland and State of Pennsylvania, have invented certain new and useful Improvements in Horse Hay-Rakes; and I do hereby declare the following to be a full, clear, and exact description of the same, reference being had to the accompanying drawings, making a part of this specification, in which—

Figure 1 represents a perspective view of the machine. Fig. 2 represents a vertical transverse section thereof. Fig. 3 represents, in perspective, a view of a portion of the machine not distinctly seen in the other figures.

Similar letters of reference, where they occur in the separate figures, denote like parts of the machine in all of the drawings.

My invention consists, first, in providing a shield for the lifting-rim on one of the main wheels, to prevent the spurs from becoming choked or clogged by any hay that may be carried up either by the main wheel or by the rake-teeth in delivering the hay.

The invention further consists in securing the cleaner-sticks to the axle by a mechanism that will hold them in working position, and admit of their being raised or lowered to make more or less room for the hay, as the condition of the crop may require, and also avoid boring the axle for the insertion of these sticks, as is most generally done.

To enable others skilled in the art to make and use my invention, I will proceed to describe the same with reference to the drawings.

The main carrying-wheels A B turn freely on the axle C, and to this axle is secured the shaft-frame D, from or to which the shafts E project, or are fastened or made a part of. The rake-head F, carrying the rake-teeth G, is hinged, by means of the brackets $a\ a$, to the main axle C, so that the rake-head may swing about the same center on which the wheels turn, for a purpose that will be presently explained.

The clearing-sticks $b$ are clamped to the axle C by means of a plate, $c$, and a through-bolt, $d$. So clamping the clearing-sticks to the axle admits of their being readily removed or replaced, or moved longitudinally on the axle, but particularly of being set up or down, to make more or less room for the hay, as the condition of the crop, or the manner of windrowing it, may require. The ordinary way of fastening these sticks is to bore holes in the axle for their reception; but in this plan the sticks are not susceptible of adjustment in any direction, and when broken are difficult to replace.

On the main wheel B is placed the lifting-rim, which is composed of a flat rim, $e$, bolted or screwed to the spokes of the wheel, and having upon it a series of radial spurs, cogs, or teeth, $f$, or nearly radial, and a ring-flange, $g$, projecting over said spurs or teeth, so as to protect them from being clogged by the hay carried up by the wheel, or thrown off the rake-teeth, and dropping into said spurs.

To the rake-head F there is hung a lever, $h$, within convenient reach of the driver in his seat H. This lever $h$ moves a slide, $i$, out and in, so as to come in contact with the lifting-rim or its spurs, and be caught by them, or moved in when the rake is not to deliver its charge of hay.

The slide $i$ is connected to the arm $j$ of a crank-trigger hinged on the rake-head, and as the slide $i$ is moved out, it correspondingly moves out the arm $k$ of said trigger. When the slide $i$ has been moved out and caught by one of the spurs $f$, said spur, in its rotation with the wheel B, swings the rake-head, raises up the teeth G, and drops the gathered hay. As the rake-head swings, the trigger-arm $k$ strikes against a dog, $l$, and moves the slide $i$ in, where it remains until again run out by the driver.

To the tongue-frame D there is pivoted, as at $m$, a bent foot-lever, I, and from the upper end of this foot-lever I a jointed bar or link, $n$, extends up, and is hinged to a bracket, $o$, on the rake-head. The driver, by holding his foot upon the foot-lever, prevents the rake-teeth from rising from the ground; or, when the teeth are raised up by the lifting-rim, he can, by his foot and this lever I, throw and hold them down again.

The axle C, instead of being all of iron, may be of wood, and the journals of iron and fastened to the wood; and in this case brackets $a\ a$ may serve as washers for the journals, but still allow the rake-head F to swing as before.

Having thus fully described my invention, what I claim therein as new, and desire to secure by Letters Patent, is—

1. In combination with the lifting-rim on the drive-wheel, the shield or projecting flange $g$, to prevent the hay from falling into and clogging said rim and its spurs, as described and represented.

2. The clearing-sticks $b$, clamped to the axle C by means of the clamp-plate $c$ and bolt $d$, so that they may be adjusted on said axle, substantially as and for the purpose described.

GEO. HAUCK.

Witnesses:
JOSEPH LEAS,
R. WILSON.